(12) United States Patent
Bachman et al.

(10) Patent No.: US 8,743,411 B2
(45) Date of Patent: Jun. 3, 2014

(54) PRINTED ITEM SELECTION INTERFACE

(75) Inventors: William Martin Bachman, San Jose, CA (US); Timothy B. Martin, Sunnyvale, CA (US); Rachel Patricia Max, San Francisco, CA (US); Brian Frick, Gaithersburg, MD (US); Michael Neuman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 536 days.

(21) Appl. No.: 12/871,769

(22) Filed: Aug. 30, 2010

(65) Prior Publication Data

US 2012/0050788 A1 Mar. 1, 2012

(51) Int. Cl.
*G06F 3/12* (2006.01)
*G06K 15/00* (2006.01)
*G06F 3/048* (2013.01)
*G06F 3/033* (2013.01)

(52) U.S. Cl.
USPC ......... 358/1.18; 358/1.15; 715/764; 715/810; 715/821; 715/822; 715/823; 715/824; 715/835; 715/863

(58) Field of Classification Search
USPC ........ 358/1.15, 1.18; 715/764, 810, 821–824, 715/835, 863
See application file for complete search history.

(56) References Cited

U.S. PATENT DOCUMENTS

2008/0066016 A1* 3/2008 Dowdy et al. ................. 715/854
2009/0287990 A1* 11/2009 Lynton et al. ................. 715/209

* cited by examiner

*Primary Examiner* — Fred Guillermety
(74) *Attorney, Agent, or Firm* — Fish & Richardson P.C.

(57) ABSTRACT

Among other things, methods, systems and computer program products are disclosed for manipulating media. In one aspect, a first set of media item images is displayed in a first region of a display screen. The media item images are moved about a predetermined path within the first region in response to a received input. A second set of media item images is displayed in a second region of the display screen where the second set of media item images are associated with an indicated media item image displayed in the first region. At least one of the media item images in the second set of media item images displayed in the second region is different from the indicated media item image.

72 Claims, 6 Drawing Sheets

PRINTED ITEM SELECTION INTERFACE

BACKGROUND

This application relates to the design and display of personalized printed media items. For example, image design software can be used to create personalized greeting cards and/or other printed objects such as calendars, business cards, maps, pamphlets, books, magazines and the like. In the greeting card example, the image design software can allow users to add images or text to a personalized greeting card and print copies of the personalized greeting card. In some implementations, the image design software can provide stock images or photos that can be included in personalized printed media items.

In some instances, users are allowed to change design aspects of a personalized media item. For example, a user can select a color for a personalized calendar. As another example, a user can select a border design for a personalized post card. In some cases, a system allows a user to store designs for personalized printed media items and retrieve previously created designs for personalized printed media items.

SUMMARY

Methods, systems and computer program products are described for facilitating the creation of printed items such as greeting cards and the like.

In one aspect, a first set of media item images is displayed in a first region of a display screen. The media item images are moved about a predetermined path within the first region in response to a received input. A second set of media item images is displayed in a second region of the display screen where the second set of media item images are associated with an indicated media item image displayed in the first region. At least one of the media item images in the second set of media item images displayed in the second region is different from the indicated media item image.

Implementations can optionally include one or more of the following features. The predetermined path can be a carousel type path. At least one of the media item images in the second set of media item images can be the same as the indicated media item image. At least one of the media item images in the second set of media item images can depict an inside view of a printed media item depicted in the indicated media item image. An indication of a design aspect for the indicated media item image can be received. The media item images in the second set of media item images can be changed to reflect the indicated design aspect. An input indicating a selection of the indicated media item image can be received. A media item image depicting an opened version of a printed media item depicted in the indicated media item image can be displayed in the first region.

An orientation of the indicated media item image can be changed in response to a second received input. Communication with a printing device can be initiated to cause a printed media item depicted in a selected media item image to be printed. A control can be provided to allow a user to specify a size for a printed media item. At least one of the media item images in the first or second set of media item images can include a picture from a collection of user pictures. The media items represented by the first set of media item images can be displayed as being arranged on a horizontal surface. Each of the displayed media items can correspond to a design for a printed media item to be generated. The printed media item to be generated can comprise one or more of a greeting card, a calendar, a business card, a book, and a magazine.

In another aspect, A first set of images is displayed where each image in the first set of images represents a printed item. An indication of a selection of a first image of the first set of images is received. The first image is displayed in an emphasized visual manner with respect to the remaining images in the first set of images, responsive to the selection. A second set of images is displayed, responsive to the selection, where each image in the second set of images is associated with the first image.

Implementations can optionally include one or more of the following features. The first set of images can be displayed while the second set of images is displayed. At least one image in the second set of images may not be included in the first set of images. At least one image in the second set of images can be the same as the first image. At least one image in the second set of images can be an opened view of a printed item represented by the first image. Each image in the second set of images can represent a possible configuration of a printed item theme represented in the first image. An indication of a design aspect for the first image can be received. The images in the second set of images can be changed to reflect the indicated design aspect.

The images in the first set of images can be moved about a predetermined path in response to a received input. The predetermined path can be a carousel type path. Communication with a printing device can be established to cause a printed item represented in a selected image of the first or second set of images to be printed. At least one of the images in the first or second set of images can include a picture from a collection of user pictures. The printed items represented by the first set of images can be displayed as being arranged on a horizontal surface. Each of the displayed images can correspond to a design for a printed media item to be generated. The printed media item to be generated can comprise one or more of a greeting card, a calendar, a business card, a book, and a magazine.

The subject matter described in this specification may provide one or more of the following potential advantages. Printed items can be easily and efficiently designed. Multiple related options for the design of a printed item can be display side by side for ready comparison. Multiple printed item design themes can be easily scrolled through. Printed item design templates can be provided in a visually pleasing manner.

The subject matter described in this specification can be implemented as a method or as a system or using computer program products, tangibly embodied in computer readable medium, such as a CD-ROM, a DVD-ROM, a semiconductor memory, and a hard disk. Such computer program products may cause a data processing apparatus to conduct one or more operations described in this specification.

In addition, the subject matter described in this specification can be implemented as a system including a processor and a memory coupled to the processor. The memory may encode one or more programs that cause the processor to perform one or more of the method acts described in this specification. Further the subject matter described in this specification can be implemented using various data processing machines.

BRIEF DESCRIPTION OF THE DRAWINGS

Like reference symbols and designations in the various drawings indicate like elements.

DETAILED DESCRIPTION

Techniques, apparatus, systems and computer program products are described for providing a printed item design and selection interface. Printed media items, such as, for example, books, greeting cards, post cards, and calendars can be designed. A user interface can allow a user to browse through templates for the printed media items. In some implementations, the user interface moves the templates along a predetermined path to allow the user to browse through various templates. The user interface can also allow design aspects of the printed media items to be changed. The printed media items can be physically produced and provided to a user.

Figure 1:
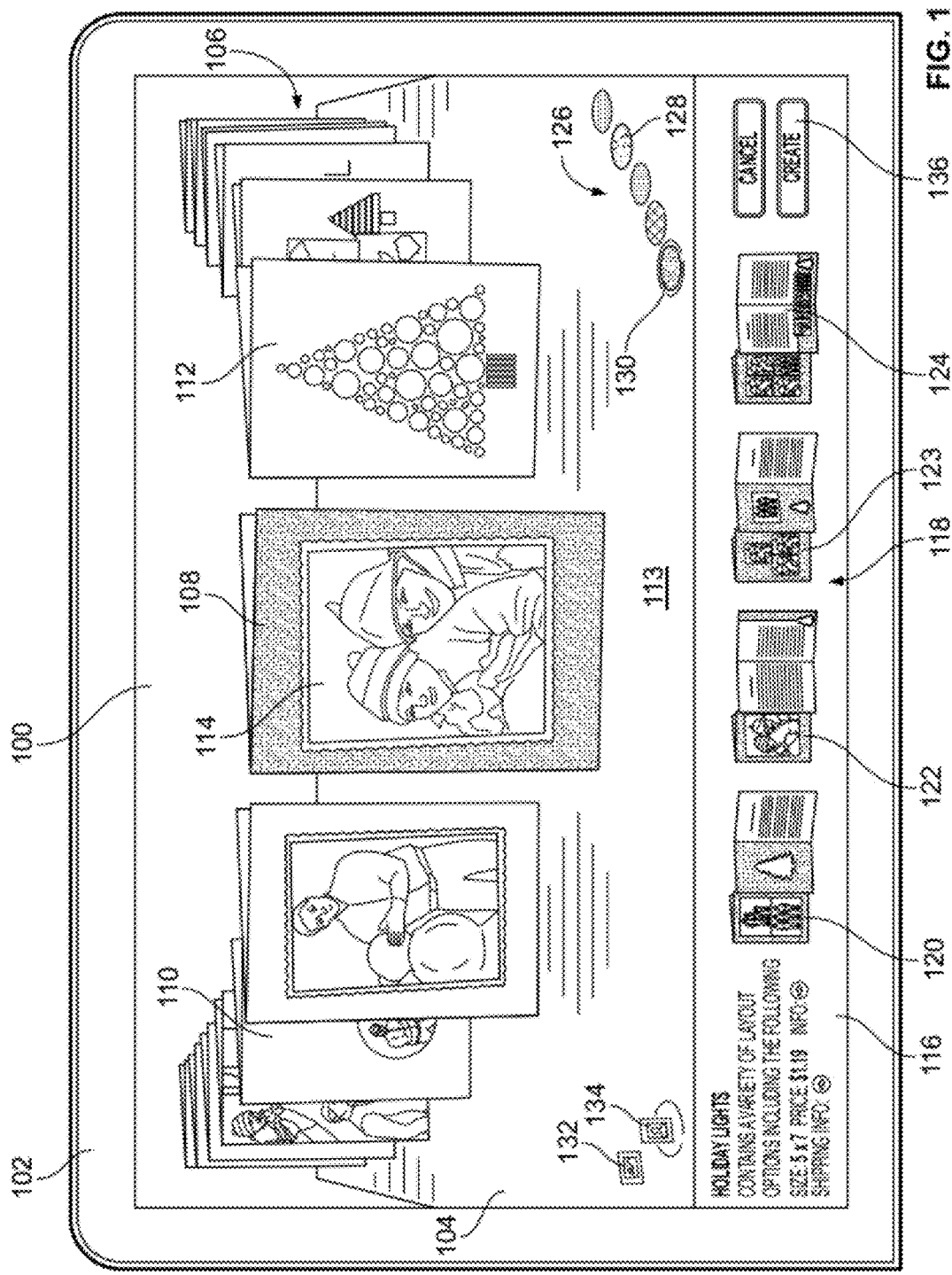
FIG. 1 shows an example printed item design and selection interface.

FIG. 1 shows a graphic user interface (GUI) 100 displayed on a display screen 102. The display screen 102 can be, for example, a computer monitor, TV, or mobile device display screen. The GUI 100 includes a first region 104 with a plurality of greeting cards 106 displayed in the first region 104. In some implementations, rather than greeting cards, other printed media items such as books, photo albums, calendars, brochures, business cards, magazines, and post cards can be depicted in the first region 104. In some implementations, a mix of printed media items including greeting cards, books, photo albums, calendars, brochures, business cards, magazines, post cards, and other printed media items are displayed in the first region 104.

In some implementations, media items other than printed media items can be displayed within the first region 104. For example, a plurality of DVDs, DVD cases, CDs, CD cases, or cassette tapes can be displayed in the first region 104. As another example, a plurality of images representing digital audio or video media can be displayed. For example, album covers associated with digital audio files can be displayed in the first region 104.

In some implementations, the plurality of greeting cards 106 can be displayed within the first region 104 such that the plurality of greeting cards 106 are depicted as being arranged on a horizontal surface 113 such as a virtual shelf, table top, or other surface. For example, the horizontal surface 113 can be a perspective view of a table surface displayed in the first region 104 and the plurality of greeting cards 106 can be displayed as being positioned on the table surface. In some implementations, rather than being displayed as being positioned on the horizontal surface 113 or another surface, the plurality of greeting cards 106 can be displayed as free floating objects in a three dimensional space.

The plurality of greeting cards 106 includes a selected greeting card 108. For example, the selected greeting card 108 can be selected by a user of the GUI 100 (e.g., by using a mouse or touch screen). In the example shown, the selected greeting card 108 is indicated as being selected by being positioned in a foreground position with respect to the remaining greeting cards in the plurality of greeting cards 106. In some implementations, the selected greeting card 108 can be indicated as being selected by being highlighted or otherwise differently illuminated, by being circled, by being located in the center of the first region 104, by being displayed with an increased size, or by having a special marking. For example, an icon can be placed over the selected greeting card 108 to indicate that it is currently selected. In some implementations, the non-selected greeting cards in the plurality of greeting cards 106 are dimmed or grayed out to indicate that the selected greeting card 108 is currently selected.

In some implementations, the plurality of greeting cards 106 can include more greeting cards than just the greeting cards shown on the display screen 102. For example, a user can scroll through the plurality of greeting cards 106 to cause other, different greeting cards of the plurality of greeting cards 106 to be displayed on the display screen 102.

A user can scroll through the plurality of greeting cards 106 using an input device. For example, the user can use a mouse to click on an area of the plurality of greeting cards 106 and drag a mouse cursor to the left or right to cause the plurality of greeting cards 106 to scroll. As another example, the user can use touch screen functionality of the display screen 102 and swipe a finger from left to right across the first region 104 to cause the plurality of greeting cards 106 to scroll to the left. As yet another example, the user can push an arrow key of a keyboard to cause the plurality of greeting cards 106 to scroll.

In some implementations the plurality of greeting cards 106 move about a predetermined path. In the example shown, the plurality of greeting cards 106 rotate about a carousel type path. The user can scroll through the plurality of greeting cards 106, for example, by swiping a stylus from left to right across the first region 104 to cause the plurality of greeting cards 106 to rotate to the right about the carousel type path. In some implementations, the horizontal surface 113 can be a "lazy susan" type surface that rotates when a user indicates that the plurality of greeting cards 106 are to be rotated. In some implementations, the plurality of greeting cards 106 can rotate by moving along the horizontal surface 113 while the horizontal surface 113 remains stationary.

Moving the plurality of greeting cards 106 can cause some of the greeting cards to move out of view while additional greeting cards move into view. For example, moving the plurality of greeting cards 106 to the left can cause the greeting card 110 to move back and left along the carousel type path until it is out of view (e.g., past a horizon point) while causing additional cards to rotate into view from the right.

In some implementations, the predetermined path can be linear, rectangular, or circular. In some implementations, the path of the plurality of greeting cards 106 is an endless path. For example, continually scrolling the plurality of greeting cards 106 to the right will eventually cause the selected greeting card 108 to return to its current position. In other implementations, the plurality of greeting cards 106 includes left and right ends.

In some implementations, the user can select a desired greeting card from the plurality of greeting cards 106 by scrolling through the plurality of greeting cards 106 until the desired greeting card is positioned in the center position (i.e., the position of the selected greeting card 108). In some implementations, the user can select a desired greeting card by clicking on the desired greeting card. For example, the user can use a mouse cursor to click on a greeting card 110. In this example, clicking on the greeting card 110 causes the plurality of greeting cards 106 to rotate to the right until the greeting card 110 is positioned in the center position.

In some implementations, each greeting card in the plurality of greeting cards 106 is associated with a theme. For example, the selected greeting card 108 is associated with a theme of "Holiday Lights," the greeting card 110 is associated with a theme of "Snow Fall," and a greeting card 112 is associated with a theme of "Holiday Tree." In some implementations, the plurality of greeting cards 106 are used as templates for creating personalized physical or electronic greeting cards. For example, the user can edit text or images of the selected greeting card 108 to create a personalized greeting card.

As another example, the plurality of greeting cards 106 are automatically generated (e.g., by a computer system in communication with the display screen 102) and displayed to the user as examples of a plurality of themes. The user can scroll through the plurality of greeting cards 106 until a greeting card having a desired theme is identified. The user can then create a personalized greeting card by editing text, images, or other visual aspects of the greeting card having the desired theme and order or print one or more physical copies of the personalized greeting card. In some implementations, the user can order or print one of the plurality of greeting cards 106 without editing (e.g., personalizing) the greeting card. For example, the user selects the greeting card 112 and prints a copy of the greeting card 112 without editing the greeting card 112.

In some implementations, the GUI 100 can include a control to allow a user to select between various themes, and each greeting card in the plurality of greeting cards 106 is associated with a sub-theme that fits into a user selected theme category. For example, the user can select an over all theme of winter holiday, and each of the plurality of greeting cards 106 can represent a sub-theme that falls under the category of winter holiday related themes. As another example, the user can select an over all theme category of birthday and a plurality of greeting cards that are associated with various different themes that fall into the category of birthday themes can be displayed within the GUI 100. For example, a birthday card having a beach theme, a birthday card having an animal theme, and a birthday card having a romantic theme can be displayed within the first region 104 in response to a user selection of a birthday theme category. As yet another example, the user can select a wedding theme category and a variety of greeting cards associated with wedding themes can be displayed in the first region 104.

In some implementations, a user selection of a theme category can cause the GUI 100 to display an animation sequence in which a "camera view" pans from the plurality of greeting cards 106 to another plurality of greeting cards (or other printed media items) associated with the user selected theme. For example, the plurality of greeting cards 106 can be depicted as being displayed on the horizontal surface 113 (e.g., a virtual shelf or table top), and the user selection of a new theme category can cause a "camera view" to pan from the horizontal surface 113 that includes the plurality of greeting cards 106 to a second horizontal surface (e.g., another, different shelf or table top) that includes a plurality of greeting cards associated with the user selected theme category. In some implementations, various pluralities of cards can be displayed by the user interface within the first region 104. For example, the plurality of greeting cards 106 can be displayed on a first virtual shelf or table surface while a second plurality of greeting cards, which is associated with a different theme category than the plurality of greeting cards 106, is displayed on a second virtual shelf or table surface. As another example, the plurality of greeting cards 106 and second plurality of greeting cards can be displayed on different shelves of a virtual bookcase.

In some implementations, some or all of the plurality of greeting cards 106 include images selected from a collection of user images. For example, the GUI 100 can be displayed on a display screen of a personal computer. One or more photo directories on the personal computer can be accessed and photos contained within the photo directories can be selected and included in some or all of the plurality of greeting cards 106. For example, the selected greeting card 108 includes a photo 114 displayed on the front of the selected greeting card 108.

In some implementations, metadata associated with images is used to select images that are related to a theme for a greeting card. For example, the theme of the selected greeting card 108 can be identified as being related to the winter holidays. Time stamp data associated with images in the collection of user images can be used to identify images that were taken around the end of December in previous years. These items can be identified as being related to the winter holidays theme since they were taken around the time of the winter holidays. As another example, face recognition metadata can be used to identify images in the collection of user images that include people's faces since users may be more likely to want to include pictures of people in holiday themed cards. As another example, person identification metadata (e.g., from tagged photos) can be used to identify images from the collection of user images that include the user or family members of the user since user may be more likely to want to include pictures of themselves or family members in holiday themed cards.

As yet another example, a greeting card can be associated with a tropical theme. Geographic location data associated with images in the collection of user images can indicate that a sub-set of the collection of user images are photos taken at Seven Mile Beach in Jamaica. The sub-set of images can be identified as being relevant to the tropical theme of the greeting card and one or more of the sub-set of images can be included in the greeting card.

Still referring to FIG. 1, the GUI 100 includes a second region 116 that is distinct from the first region 104. A set of greeting cards 118 are displayed in the second region 116. In some implementations, the set of greeting cards 118 are associated with the selected greeting card 108. In the example shown, each of the greeting cards in the set of greeting cards 118 employs the same theme as the selected greeting card 108 (e.g., the Holiday Lights theme). As another example, each of the greeting cards in the set of greeting cards 118 includes one or more images included in the selected greeting card 108. For example, each card in the set of greeting cards 118 can include the photo 114.

In some implementations, the second region 116 can include a visual depiction of the edge of a shelf, table top, or other surface. For example, the plurality of greeting cards 106 within the first region 104 can be displayed as being arranged on a table surface. A depiction of a front table edge associated with the table surface can be displayed as the second region 116. In some implementations, the second region 116 can be positioned above, below, to the left of, to the right of, or enclosed within the first region 104.

In some implementations, each card in the set of greeting cards 118 can be associated with the selected greeting card 108 by having a same design style as the selected greeting card 108. For example, the selected greeting card 108 can have a unique cut out pattern or boarder pattern and each of the greeting cards in the set of greeting cards 118 can have the same unique cut out pattern or boarder pattern.

In the example shown, four greeting card pairs are displayed in the second region 116 with each greeting card pair showing a front view and an inside view of a printed greeting card. In some implementations, the set of greeting cards 118 can include more or less greeting cards. For example, the set of greeting cards 118 can include 1, 6, or 12 greeting cards. In some implementations, the greeting cards in the set of greeting cards 118 are displayed as solitary greeting cards rather than being displayed in greeting card pairs. In some implementations, the greeting cards in the set of greeting cards 118 can be displayed in groups of three, with each group of three showing front, inside, and rear views of a printed greeting card.

In some implementations, at least one of the greeting cards in the set of greeting cards 118 is different than the selected greeting card 108. For example, a greeting card 120 has the same theme as the selected greeting card 108 but includes photos on the front that are different than the photo 114 shown on the front of the selected greeting card 108. In some implementations, one of the greeting cards in the set of greeting cards 118 is the same as the selected greeting card 108. For example, a greeting card 122 is the same as the selected greeting card 108.

In some implementations, the GUI 100 allows a user to create a personalized greeting card using greeting cards in the plurality of greeting cards 106 and/or the set of greeting cards 118. For example, the user can select the greeting card 120 to cause the one photo arrangement of the selected greeting card 108 to be replaced by the two photo arrangement shown by the greeting card 120. As another example, the user can select a greeting card 123 to cause the selected greeting card 108 to take on the look and/or layout of the greeting card 123.

In some implementations, the user can replace one or more automatically populated images of the selected greeting card 108 by selecting (e.g., right clicking) the selected greeting card 108 and browsing through a directory of photos, or by dragging and dropping one or more photos over photo positions currently displayed on the selected greeting card 108. For example, the user can drag and drop a desired photo over the photo 114 to replace the photo 114 with the desired photo. In this example, the selected greeting card 108 is then displayed with the desired photo on the front in place of the photo 114.

In some implementations, the user can create a personalized greeting card by matching inside views and front views displayed in the set of greeting cards 118. For example, the user can select an inside view 124 using a cursor and drag over the greeting card 122 to match the inside view 124 with the front view of the greeting card 122. The inside view 124 and the front view of the greeting card 122 can then be displayed as a greeting card pair.

In some implementations, the user can change a color, pattern, boarder, or other design aspect of the selected greeting card 108 or one or more of the greeting cards in the set of greeting cards 118. For example, the GUI 100 can include user selectable icons 126 that allow the user to change a color or pattern of the greeting cards in the set of greeting cards 118. The user can select an icon 128 to cause the color of the greeting cards in the set of greeting cards 118 to change to blue. As another example, the user can select an icon 130 to cause one or more of the greeting cards in the set of greeting cards 118 and the selected greeting card 108 to change to a striped pattern. As yet another example, the GUI 100 can allow the user to change the shape of one or more of the greeting cards in the set of greeting cards 118 from a rectangular shape to an oval or heart shape. As yet another example, the GUI 100 can allow the user to change the font of text printed on the greeting card 120. In some implementations, design aspects for the set of greeting cards 118 can include size and orientation.

In some implementations, the GUI 100 allows the user to change an orientation of the selected greeting card 108. For example, selecting an icon 132 can cause the selected greeting card 108 to change from a portrait orientation to a landscape orientation. In some implementations, selecting the icon 132 also causes one or more of the greeting cards in the set of greeting cards 118 to change to a landscape orientation. Selecting an icon 134 can cause the selected greeting card 108 or one or more of the greeting cards in the set of greeting cards 118 to return to a portrait orientation.

In some implementations, changing the orientation of a greeting card can cause other aspects of the greeting card to change. For example, changing the orientation of the selected greeting card 108 from portrait to landscape can cause the photo 114 to be replaced with a landscape oriented photo on the front of the selected greeting card 108.

In some implementations, the GUI 100 can include one or more controls to allow a user to select the size and/or shape of a greeting card or other printed media item. For example, a plurality of books can be displayed by the GUI 100. The user can select a control to specify a size for a selected book (e.g., 8"×11" or 5"×4"). As another example, a user can select a control to specify a size for the selected greeting card 108.

In some implementations, the GUI 100 allows the user to edit text of a greeting card. For example, the user can add text to the front of the selected greeting card 108. As another example, the user can select text on the front of the selected greeting card 108 and edit the selected text. As another example, the user can click on the selected greeting card 108 to cause an inside view for the selected greeting card 108 to be displayed (e.g., the selected greeting card 108 opens). The user can then add text to the inside of the selected greeting card 108 or edit text of the inside of the selected greeting card 108.

In some implementations, the inside of the selected greeting card 108 can be initially populated with generic text or text derived from a greeting card previously created by the user. For example, the selected greeting card 108 can include text taken from a holiday card from the previous year with the year changed to the current year. As another example, the selected greeting card 108 can be populated with a generic greeting with spaces for the user to fill in text. In some implementations, the selected greeting card 108 can be populated with text related to the theme of the selected greeting card 108. For example, since the theme of the selected greeting card 108 is "Holiday Lights," text on the inside of the selected greeting card 108 can read "Happy Holidays from all of us." The user can choose to keep the text, or edit the text in-order to create a more personalized message. As another example, a greeting card having a birthday theme, text on the inside of the birthday themed greeting card can read "Happy Birthday!"

In some implementations, the GUI 100 allows a user to change the appearance of a greeting card after text has been entered. For example, the user clicks on the selected greeting card 108 to cause an inside view of the selected greeting card 108 to be displayed. The user then enters text for the inside of the selected greeting card 108. The user can then select the inside view 124 to cause the layout of the inside of the selected greeting card 108 to change to the layout shown by the inside view 124 while keeping the text entered by the user. The user can elect to keep the photos shown in the inside view 124 or replace the photos with other photos as described above.

In some implementations, the GUI 100 allows the user to change the size of a greeting card. For example, the GUI 100 can include a drop down menu that allows the user to choose from among several sizes of greeting cards. As another example, the GUI 100 can include an icon that allows the user to change the size of the selected greeting card 108 from 5¼"×7¼" to 4¼"×5½".

In some implementations, the GUI 100 allows the user to purchase or print a greeting card. For example, after selecting a layout, selecting photos, and editing text for the selected greeting card 108, the user can select a create button 136 to place an order for one or more physical copies of the selected greeting card 108. In some implementations, the create button 136 can redirect the user to a preview screen where the user can preview a finalized version of the selected greeting card 108. The preview screen can allow the user to return to the display screen shown in FIG. 1 to make changes to the selected greeting card 108. In some implementations, the create button 136 can redirect the user to a payment screen where the user can enter payment information for ordering one or more physical copies of the selected greeting card 108. In some implementations, the create button 136 can automatically place an order for a physical copy of the selected greeting card 108.

In some implementations, the GUI 100 includes a print button that allows the user to print one or more copies of the selected greeting card 108. For example, selecting the print button can redirect the user to a printing options screen where the user can select a printer and other printing options. In some implementations, selecting the print button can add the selected greeting card 108 to a print queue that includes other printed items.

In some implementations, selecting a greeting card from the plurality of greeting cards 106 causes the greeting cards displayed in the second region 116 to change. For example, the user can select the greeting card 110 or scroll through the plurality of greeting cards 106 to cause the greeting card 110 to positioned in the center position (e.g., selected position). This can cause the set of greeting cards 118 to replaced with a different set of greeting cards that are associated with the greeting card 110. For example, selecting the greeting card 110 can cause a set of greeting cards having the "Snow Fall" theme to be displayed in the second region 116. As another example, scrolling through the plurality of greeting cards 106 until the greeting card 112 is positioned in the foreground position can cause a set of greeting cards having the "Holiday Tree" theme to be displayed in the second region 116. As yet another example, selecting a greeting card with a uniquely patterned boarder can cause a set of greeting cards having the same patterned boarder to be displayed in the second region 116.

Figure 2:
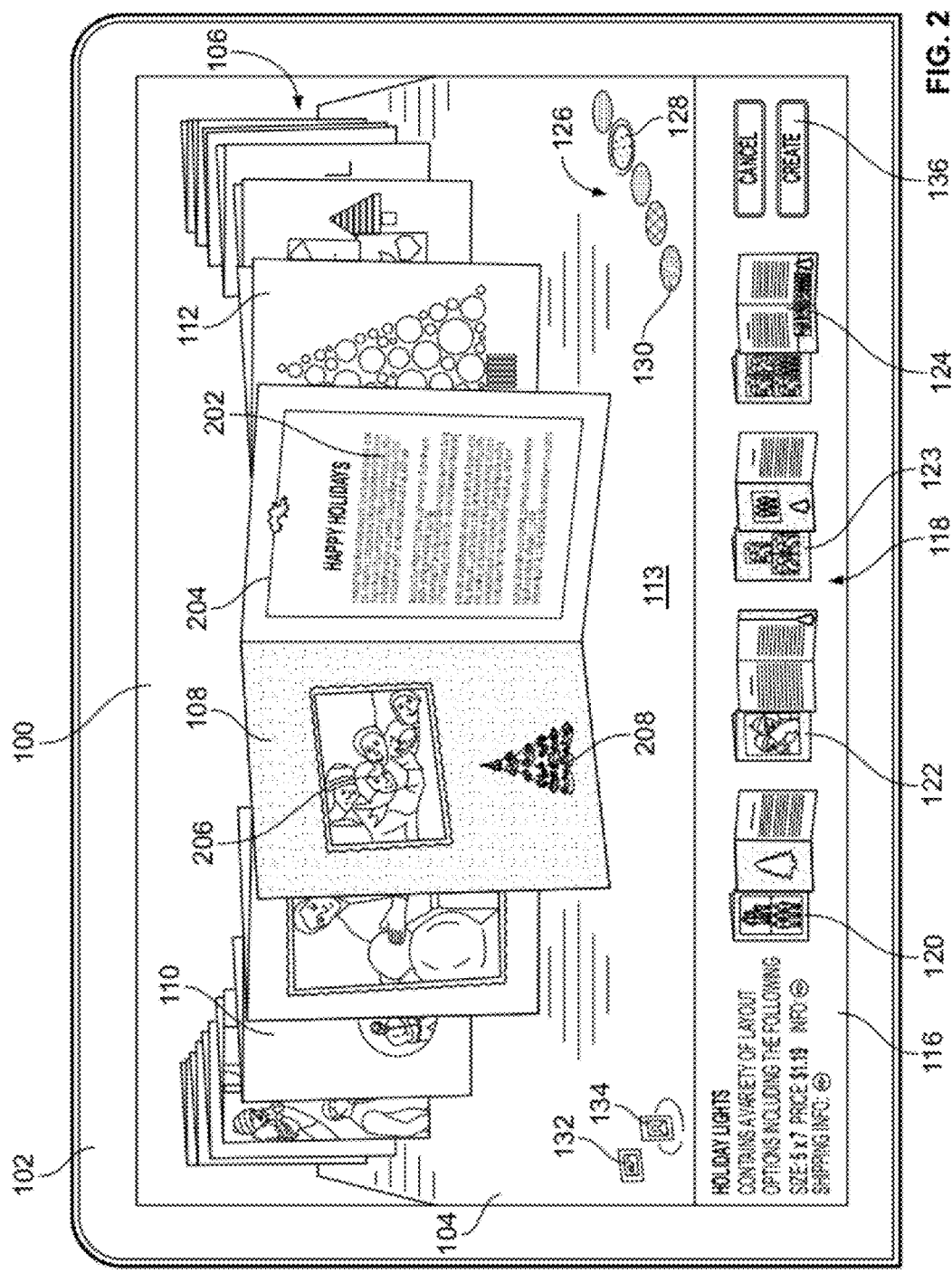
FIG. 2 shows an open card view of the printed item design and selection interface of FIG. 1.

FIG. 2 shows the GUI 100 with an inside view of the selected greeting card 108 displayed. For example, the user can select the selected greeting card 108 as shown in FIG. 1 to cause the inside view of the selected greeting card 108 to be displayed. In some implementations, the GUI 100 can show an animation of the selected greeting card 108 opening as a transition between the front view and the inside view of the selected greeting card 108.

In the example shown, the inside view of the selected greeting card 108 is the same as the inside view of the greeting card 123. For example, the user can select the greeting card 123 to cause the selected greeting card 108 to take on the same design features as the greeting card 123.

The user can edit text and other aspects of the inside view of the selected greeting card 108. For example, the user can select text 202 in order to add, delete, or edit the text 202. The user can additionally change a font, size, color or orientation of the text 202. As another example, the user can change the design of a border 204 to a different border design or to no border design. In some instances, the user can change sizes or positions of a photo 206 and an image 208 displayed on the inside view of the selected greeting card 108. For example, the user can position the image 208 above the photo 206. As another example, the user can enlarge the photo 206 and change the orientation of the photo 206 by rotating the photo 206 by 90 degrees.

In some implementations, the user can add additional photos or images to the inside view of the selected greeting card 108 or replace the photo 206 or the image 208. For example, the user can select the image 208 and hit a delete key to remove the image 208 from the selected greeting card 108. As another example, the user can drag a new photo from a photo directory over the photo 206 to cause the photo 206 to be replaced by the new photo. As another example, the user can drag a photo to an open area of the selected greeting card 108 to cause the photo to be added to the selected greeting card 108. As yet another example, the user can insert an image into the text 202. This can cause the text 202 to be reformatted to fit around the inserted image.

In some implementations, once the user has finished editing the selected greeting card 108, the user can print or order one or more physical copies of the selected greeting card 108. For example, the user can select the create button 136 to cause a physical copy of the selected greeting card 108 to be shipped to the user. After editing the selected greeting card 108, the user can scroll through the plurality of greeting cards 106 and edit aspects of other greeting cards in the plurality of greeting cards 106.

As mentioned above, although the examples depicted in FIGS. 1 and 2 are described with reference to greeting cards, the same functionality can be used to create books (including photo books), calendars, and post cards. For example, the user can select a calendar having a theme from a plurality of calendars which can cause a set of calendars having the same theme to be displayed in the second region 116. The calendars can include images selected from a collection of user images. The user can select a layout from among the calendars displayed in the second region 116 and edit photos, images, and text of the calendars. The GUI 100 can allow the user to flip through the pages of a calendar to edit each page.

Figure 3:
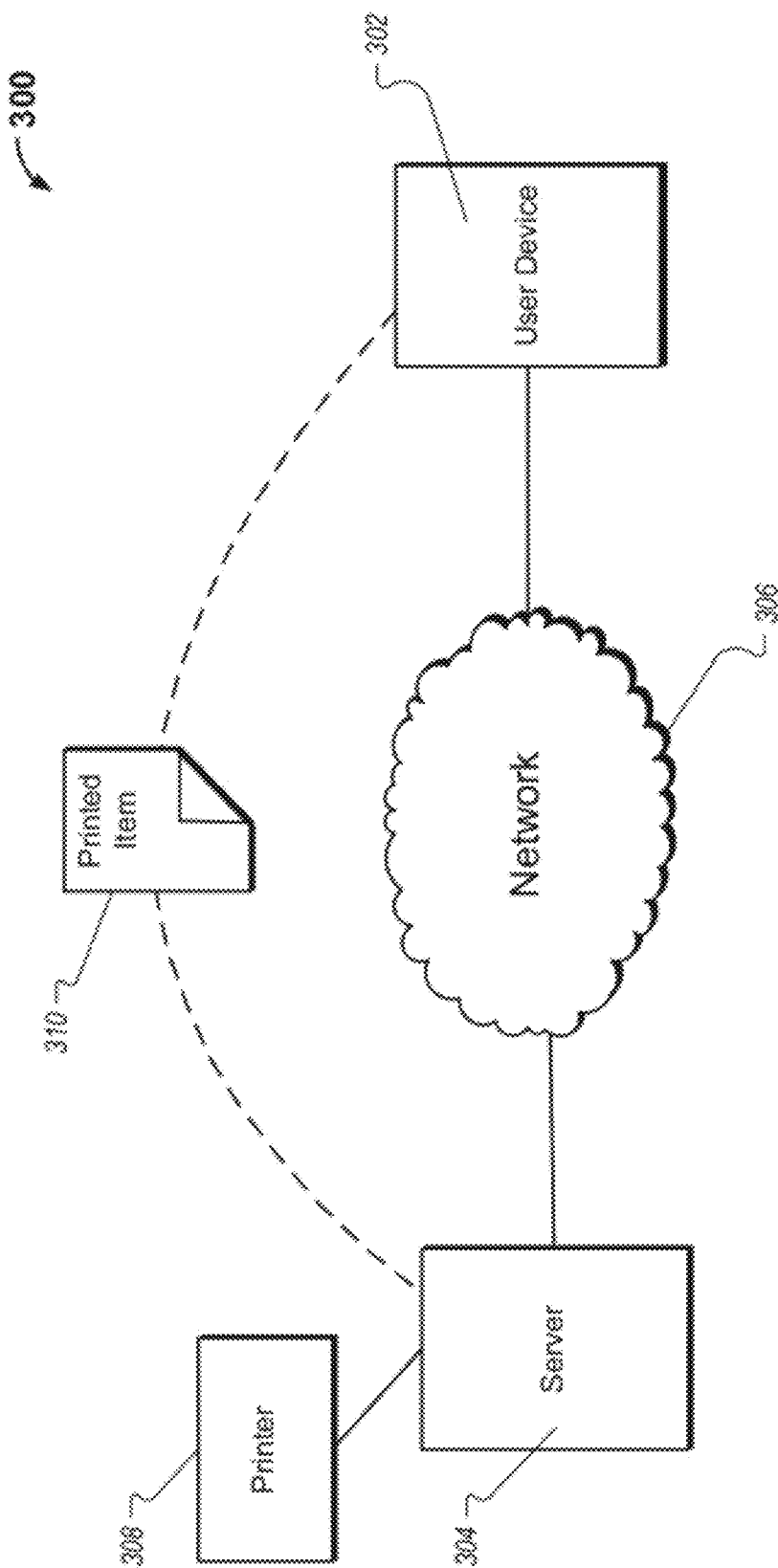
FIG. 3 shows an example system for printed item design and printing.

FIG. 3 shows an example system 300 for printed item design and printing that includes a user device 302 in communication with a server 304 through a network 306 (e.g., the Internet, a LAN, or a WAN). The user device 302 can be, for example, a personal computer (e.g., desktop or laptop), a mobile phone, a personal digital assistant (PDA), a gaming system, or a web enabled TV. The user device 302 can display a graphic user interface (GUI) to a user that can allow the user to design a printed item such as, for example, a book (including a photo book), a greeting card, a calendar, or a post card.

The user device 302 can allow the user to scroll through a plurality of design templates and select a template from among the plurality of design templates. In some implementations, each template can be associated with a theme. For example, templates for post cards can be associated with themes of "winter fun," "beach," sun shine," "garden," "spring time," and "ocean view." In some implementations, the user device 302 automatically populates some or all of the templates with images and text. For example, the user device 302 can automatically populate photo book templates with pictures obtained from a user photo directory. The user photo directory can be stored on the user device 302, on a database connected to the user device 302, or on a device in communication with the user device 302 (such as the server 304). As another example, the user device 302 can automatically populate a Thanksgiving themed card with the text "Hope you're ready for the turkey."

In some implementations, the templates are associated with images that relate to the themes of the templates. For example, a template having a skiing theme can be automatically populated with one or more photos located in a "ski vacation" directory. As another example, the skiing themed template can be populated with one or more photos associated with metadata indicating that the photos were taken at a ski resort.

In some implementations, the user device 302 displays one or more printed item layouts associated with a template indicated by the user. For example, the user can select a template for a greeting card from the plurality of design templates. The user device 302 can display a plurality of greeting card templates having the same theme as the selected template where each of the newly displayed greeting cards shows a different layout for a theme of the selected template. The user can select a greeting card template having a desired layout and edit images or text of the selected greeting card template. For example, the user can replace a photo of the selected greeting card template with a photo chosen from a photo directory on the user device 302. As another example, the user can edit text of the selected greeting card template to create a personalized greeting.

In some implementations, the server 304 provides some or all of the templates to the user device 302 through the network 306. In some implementations, the user device 302 can obtain templates from other sources. For example, the user device 302 can load templates from a CD-ROM. In some implementations, the server 304 can provide themes, text, and/or images to the user device 302 and the user device 302 can create the templates using the received themes, text, and/or images. For example, the user device 302 can receive a theme for a book from the server 304. The user device 302 can create a template using the received theme, photos obtained from a photo directory of the user device 302, and text derived from a previously created book. As another example, the user device 302 can create a template for a greeting card using images and text received from the server 304 and a theme loaded onto the user device 302 from a CD-ROM.

The user can design a personalized printed item by selecting a template from the plurality of templates, selecting a layout for the template, and editing aspects of the template. Aspects of the template that can be edited by the user can include, for example, photos, images, text, boarders, backgrounds, borders, shape, orientation, and patterns. After designing a personalized printed item, the user can order one or more physical copies of the printed item. In some implementations, rather than designing a personalized printed item, the user can select a template of a printed item and order one or more physical copies of the printed item depicted by the template.

The server 304 can receive the order for a printed item from the user device 302. In some implementations, the order can indicate a template used to design the printed item or a theme for the printed item as well as text and image provided by the user. In some implementations, the server 304 can additionally collect payment information (e.g., credit card information) from the user device 302 in order to process the order.

The server 304 can communicate with a printer 308 to cause one or more physical copies of the printed item indicated in the order to be created. In some implementations, the printer 308 can include a collection of systems for printing and assembling a printed item. For example, the printer 308 can include a first system for printing a text portion of a greeting card, a second system for printing photo portions of a greeting card, and a third system for assembling the text portion and he photo portions of the greeting card into a single greeting card. As another example, the printer 308 can include a printing system for printing pages of a calendar and an assembly system for assembling the pages together into a calendar. As yet another example, the printer 308 can include an apparatus for imparting pressed letters or other designs onto a greeting card.

In some implementations, after manufacturing, a printed item 310 is physically delivered to the user of the user device 302. For example, a mailing apparatus can affix postage and an address label onto a package containing the printed item 310 to cause the printed item 310 to be shipped to the user of the user device 302. In some implementations, rather than being delivered to the user of the user device 302, the printed item can be delivered to an intended recipient. For example, the user can design a holiday card and send an order for 10 physical copies of the holiday card to the server 304. The physical copies of the holiday card can be delivered to ten different intended recipients.

Figure 4:
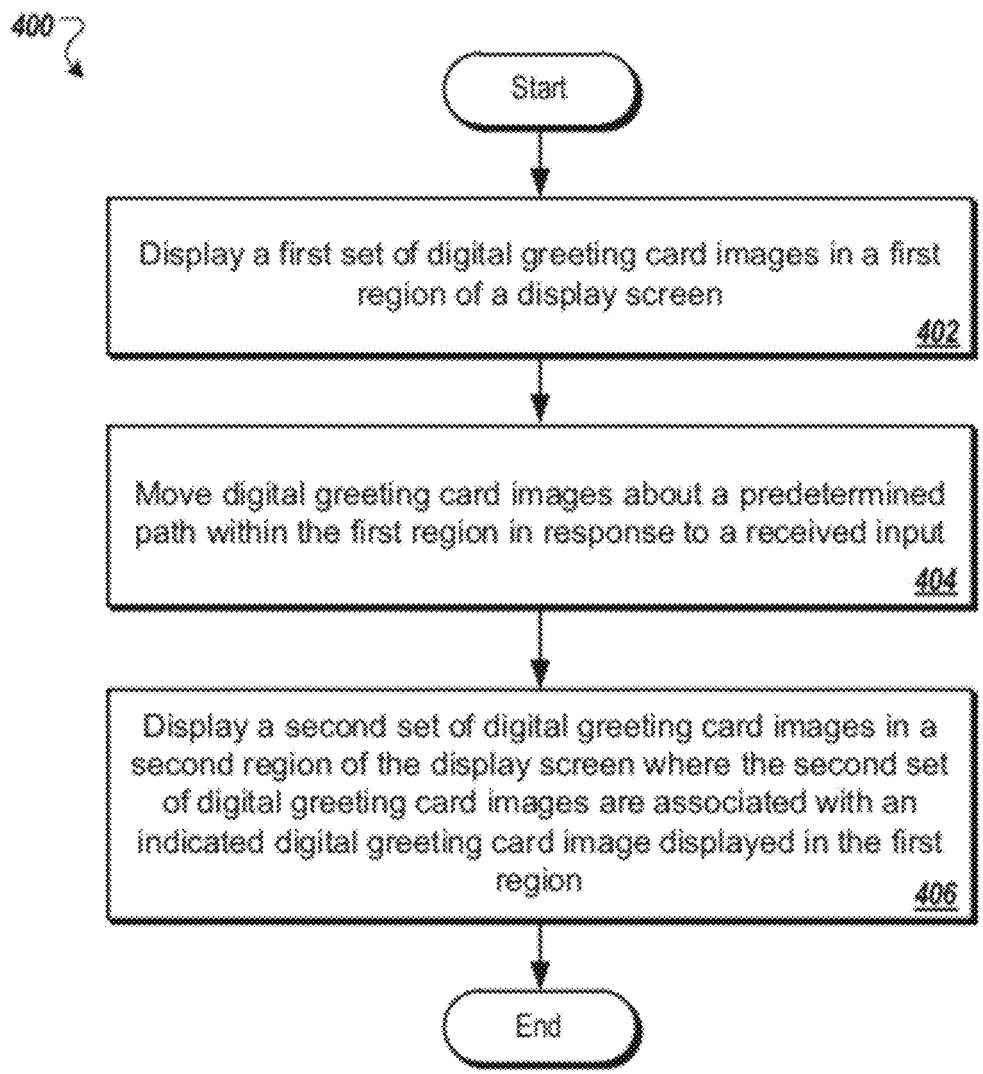
FIG. 4 is a flow diagram of an example process for providing a greeting card selection interface.

FIG. 4 is a process flow diagram showing an example process 400 for providing a greeting card selection interface. In some implementations, the process 400 can be performed by, for example, the user device 302 shown in FIG. 3. A first set of digital greeting card images are displayed in a first region of a display screen (402). For example, referring to FIG. 1, the plurality of greeting cards 106 are displayed in the first region 104. In the example shown in FIG. 1, the plurality of greeting cards 106 are arranged in a carousel type arrangement. In other implementations, the first set of digital greeting card images can be arranged in other patterns, such as linear, or rectangular. In some implementations, the first set of digital greeting card images are a sub-set of a larger set of digital greeting card images.

The digital greeting card images are moved about a predetermined path within the first region in response to a received input (404). For example, referring to FIG. 1, a user can swipe a finger from left to right across the display screen 102 to cause the plurality of greeting cards 106 to move about a carousel type path. As another example, a user can select a digital greeting card image to cause the first set of digital greeting card images to rotate about a circular path until the selected greeting card is in a foreground position with respect to the other digital greeting card images. As yet another example, a user can use a mouse to drag the digital greeting card images and cause the digital greeting card images to move about a linear path. In some implementations, moving the digital greeting card images about a predetermined path causes other, different digital greeting card images that were not initially displayed in the first region to be displayed in the first region. For example, causing the digital greeting card images to move to the right can cause some of the first set of digital greeting card images to move off of a screen to the right while causing other, new digital greeting card images to appear on screen from the left.

A second set of digital greeting card images are displayed in a second region of the display screen where the second set of digital greeting card images are associated with an indicated digital greeting card image displayed in the first region (406). For example, referring to FIG. 1, the set of greeting cards 118 is displayed in the second region 116 of the display screen 102 and each of the greeting cards in the set of greeting cards 118 has a theme that is the same as the theme of the selected greeting card 108. As another example, a set of greeting cards having a same boarder design as an indicated greeting card can be displayed. As yet another example, a set of greeting cards that all include the same photo as a photo included in an indicated greeting card can be displayed. In this example, each of the greeting cards in the set of greeting cards can display a different theme in conjunction with the photo.

In some implementations, at least one of the digital greeting card images in the second set of digital greeting card images displayed in the second region is different from the indicated digital greeting card image. For example, referring to FIG. 1, the greeting card 120 is different from the selected greeting card 108 even though the greeting card 120 and the selected greeting card 108 share a common theme. In contrast, the greeting card 122 is the same as the selected greeting card 108.

In some implementations of the process 400, more or fewer steps can be performed or one or more steps can be performed in a different order. For example, the process 400 can include a step of receiving digital greeting card image data from a remote server prior to the step of displaying the first set of digital greeting card images. As another example, the process 400 can include steps of receiving an indication of a design aspect for the indicated digital greeting card image and changing the digital greeting card images in the second set of digital greeting card images to reflect the indicated design aspect.

Figure 5:
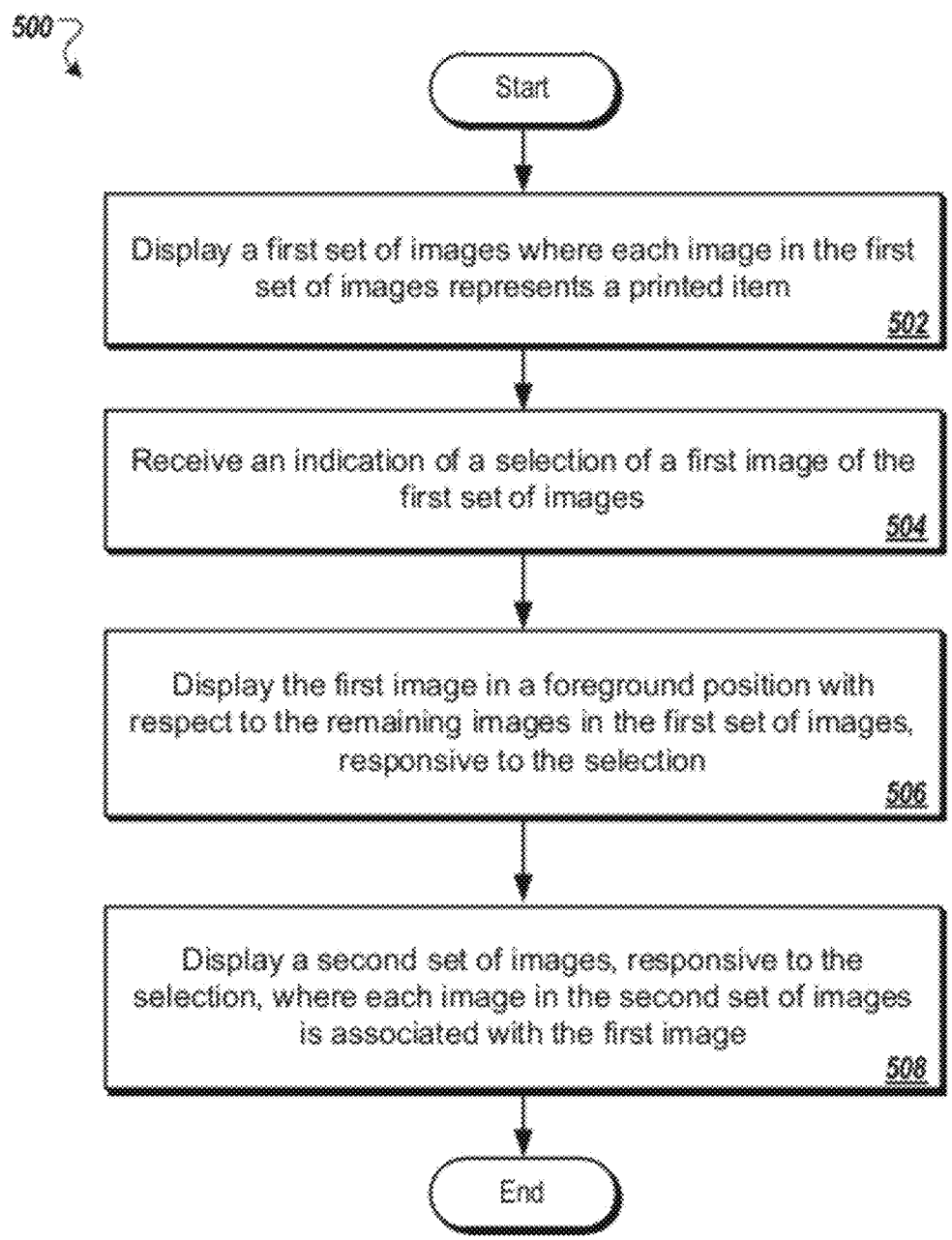
FIG. 5 is a flow diagram of an example process for providing a printed item selection interface.

FIG. 5 is a process flow diagram showing an example process 500 for providing a printed item selection interface. In some implementations, the process 500 can be performed by, for example, the user device 302 shown in FIG. 3. A first set of images is displayed where each image in the first set of images represents a printed item (502). For example, a set of images depicting books can be displayed on a display screen. As another example, a group of cards, calendars, stationary, and envelopes are displayed on a display screen. As yet another example, referring to FIG. 1, the plurality of greeting cards 106 are displayed on the display screen 102.

An indication of a selection of a first image of the first set of images is received (504). For example, a user can use a mouse to click on an image of a book to select the book. As another example, a user can scroll through a collection of images of calendars, books, and cards until a desired image is displayed in a selected position (e.g., a foreground position or central position). As another example, referring to FIG. 1, the GUI 100 allows a user to select the selected greeting card 108.

The first image is displayed in a foreground position with respect to the remaining images in the first set of images, responsive to the selection (506). For example, referring to FIG. 1, the selected greeting card 108 is positioned in a foreground position with respect to the other greeting cards in the plurality of greeting cards 106. As another example, a user can select the greeting card 110 to cause the greeting card 110 to be displayed in a foreground position with respect to the other greeting cards in the plurality of greeting cards 110. As another example, a user can select an image of a calendar from a row of images of calendars. This can cause the image of the calendar to be brought forward and be positioned in front of the other images of calendars. As yet another example, a user scrolls through a collection of images of printed items until an image of a desired printed item is positioned in a foreground position.

A second set of images is displayed, responsive to the selection, where each image in the second set of images is associated with the first image (508). For example, referring to FIG. 1, the set of greeting cards 118 is displayed on the display screen responsive to the selected greeting card 108 being selected. Each greeting card in the set of greeting cards 118 has a theme that is the same as the theme of the selected greeting card 108. As another example, selecting the greeting card 112 can cause a set of greeting cards, different from the set of greeting cards 118 to be displayed where each greeting card in the newly displayed set of greeting cards has a theme that is the same as the theme of the greeting card 112. As another example, selecting an image of a printed item can cause a pop-up window to appear with a group of printed items being displayed in the pop-up window. Each printed item displayed in the pop-up window can include the same text and images as the selected printed item.

In some implementations of the process 500, more or fewer steps can be performed or one or more steps can be performed in a different order. For example, the process 500 can include a step of receiving image data from a remote server. As another example, the process 500 can include a step of a printing device to cause a printed item represented in a selected image of the first or second set of images to be printed.

Figure 6:
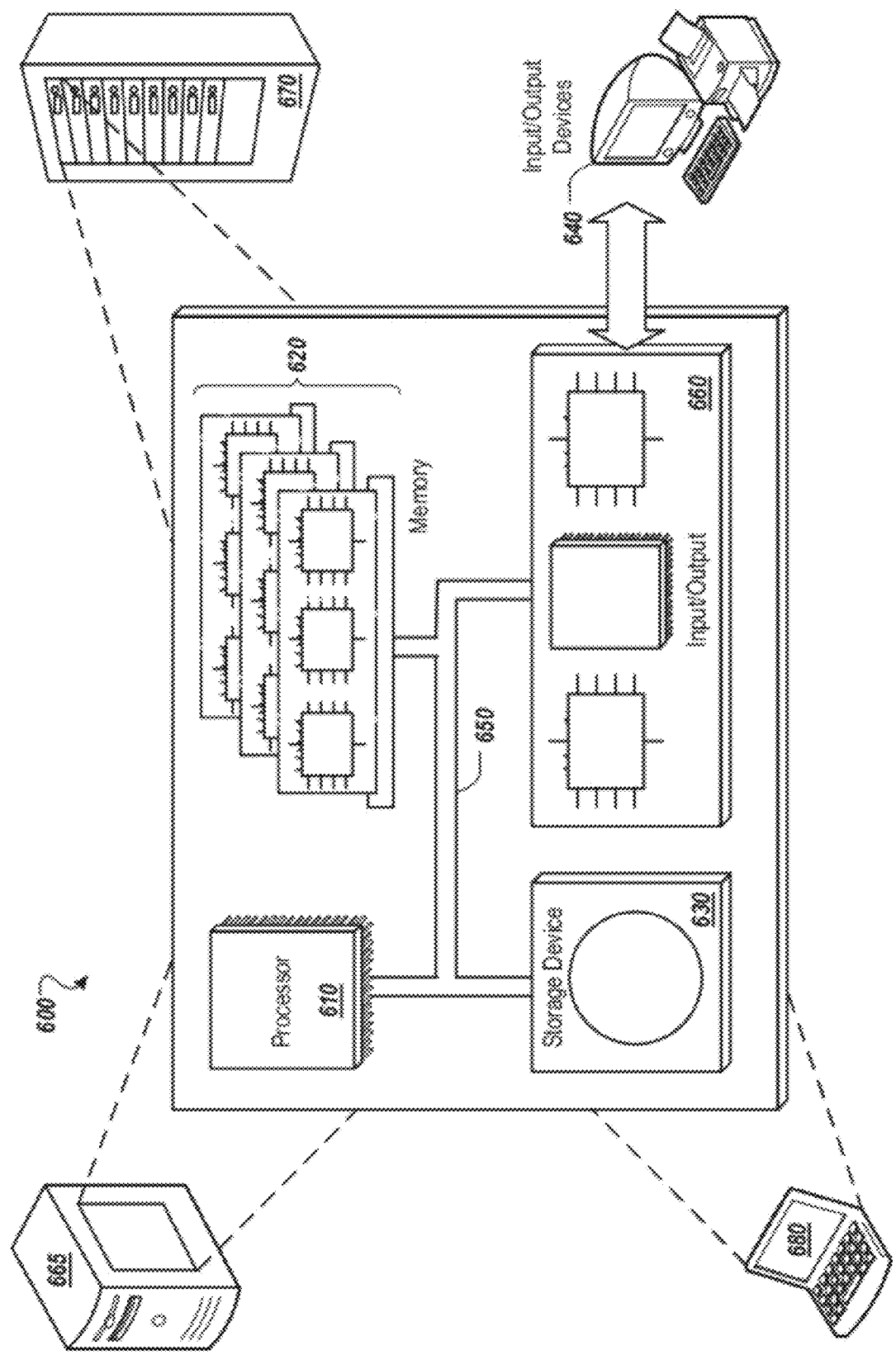
FIG. 6 is a block diagram of a computing device and system that can be used in connection with computer-implemented methods and systems described in this document.

FIG. 6 is a block diagram of a computing device and system that can be used, e.g., provide a user interface for designing a printed item. Computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 600 includes a processor 610, memory 620, a storage device 630, a high-speed interface 650 connecting to memory 620. The computing device can also include high-speed expansion ports (not shown), and a low speed interface (not shown) connecting to low speed bus (not shown) and storage device 630. Each of the components 610, 620, 630, 650, and 620, are interconnected using various busses, and can be mounted on a common motherboard or in other manners as appropriate. The processor 610 can process instructions for execution within the computing device 600, including instructions stored in the memory 620 or on the storage device 630 to display graphical information for a GUI on an external input/output device, such as display 640 coupled to an input/output interface 660. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 620 stores information within the computing device 600. In one implementation, the memory 620 is a computer-readable medium. In one implementation, the memory 620 is a volatile memory unit or units. In another implementation, the memory 620 is a non-volatile memory unit or units.

The storage device 630 is capable of providing mass storage for the computing device 600. In one implementation, the storage device 630 is a computer-readable medium. In various different implementations, the storage device 630 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 620, the storage device 630, or memory on processor 610.

The high speed controller 650 manages bandwidth-intensive operations for the computing device 600, while the low speed controller manages lower bandwidth-intensive operations. Such allocation of duties is exemplary only. In one implementation, the high-speed controller 650 is coupled to memory 620, display 640 (e.g., through a graphics processor or accelerator), and to high-speed expansion ports (not shown), which can accept various expansion cards (not shown). In the implementation, low-speed controller (not shown) is coupled to storage device 630 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 665, or multiple times in a group of such servers. It can also be implemented as part of a rack server system 670. In addition, it can be implemented in a personal computer such as a laptop computer 680.

Implementations of the subject matter and the functional operations described in this specification can be configured in digital electronic circuitry, or in computer software, firmware, or hardware, including the structures disclosed in this specification and their structural equivalents, or in combinations of one or more of them. Implementations of the subject matter described in this specification can be configured as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application. A number of embodiments have been described. Nevertheless, it will be understood that various modifications are optionally made without departing from the spirit and scope of this disclosure. Accordingly, other embodiments are within the scope of the following claims.

What is claimed is:

1. A computer-implemented method performed by one or more processors, the method comprising:
    displaying a first set of first template images in a first region of a display screen, each first template image is associated with a respective theme and includes a respective feature that is displayed with each first template image, each first template image associated with a second set of second template images that have the same theme as each first template image with which the second set of second template images is associated;
    receiving input to move the first set of first template images about a predetermined path within the first region, wherein the predetermined path includes a location;
    in response to receiving the input, moving a first template image to the location;
    identifying the first template image that has been moved to the location;
    in response to identifying the first template image that has been moved to the location:
        displaying the selected first template image with a feature in the first region of the display screen,
        identifying a second set of second template images associated with the selected first template image that have the same theme as the selected first template image, and
        displaying each second template image in the identified second set of template images in a second region of the display screen adjacent the first region, wherein a second template image included in the identified second set includes a feature that is different from the feature that is displayed with the selected first template image in the first region of the display screen.

2. The method of claim 1, wherein the predetermined path is a carousel type path.

3. The method of claim 1, wherein at least one second template image in the identified second set of template images is the same as the first template image.

4. The method of claim 1, wherein at least one second template image in the identified second set of template images depicts an inside view of a printed media item depicted in the first template image.

5. The method of claim 1, further comprising:
    receiving an indication of a design aspect for the first template image; and
    changing the second template images in the identified second set of template images to reflect the indicated design aspect.

6. The method of claim 1, further comprising:
    receiving an input indicating a selection of the first template image; and
    displaying, in the first region, a media item image depicting an opened version of a printed media item depicted in the first template image.

7. The method of claim 1, further comprising changing an orientation of the first template image in response to a second received input.

8. The method of claim 1, further comprising communicating with a printing device to cause a printed media item depicted in a selected second template image to be printed.

9. The method of claim 1, further comprising providing a control to allow a user to specify a size for a printed media item.

10. The method of claim 1, wherein at least one of the template images in the first or second set includes a picture from a collection of user pictures.

11. The method of claim 1, wherein the template images included in the first set are displayed as being arranged on a horizontal surface.

12. The method of claim 1, wherein each first template image displayed in the first region corresponds to a design for a printed media item to be generated.

13. The method of claim 12, wherein the printed media item to be generated comprises one or more of a greeting card, a calendar, a business card, a book, and a magazine.

14. A computer-implemented method to be performed by one or more processors, the method comprising:
    displaying, in a first display region, a first set of first template images, each first template image associated with a theme, each first template image associated with a second set of one or more second template images that have the same theme as each first template image with which the second set of second template images is associated, where each first template image in the first set of first template images represents a printed item;
    receiving an indication of a selection of a first template image of the first set of first template images; and
    in response to receiving the indication of the selection of the first template image:
        displaying, in the first display region, the first template image in an emphasized visual manner with respect to the remaining first template images in the first set of first template images,
        identifying a second set of one or more second template images associated with the selected first template image that have the same theme as the selected first template image, and
        displaying, in a second display region that is adjacent the first display region, the one or more second template images included in the second set of second template images.

15. The method of claim 14, further comprising continuing to display the first set of first template images while displaying the second set of second template images.

16. The method of claim 14, wherein at least one image in the second set of second template images is not included in the first set of first template images.

17. The method of claim 14, wherein at least one image in the second set of second template images is the same as the selected first template image.

18. The method of claim 14, wherein at least one second template image in the second set of second template images is an opened view of a printed item represented by the selected first template image.

19. The method of claim 14, wherein each second template image in the second set of second template images represents a possible configuration of a printed item theme represented in the selected first template image.

20. The method of claim 14, further comprising:
receiving an indication of a design aspect for the selected first template image; and
changing the second template images in the second set of second template images to reflect the indicated design aspect.

21. The method of claim 14, further comprising moving the first template images in the first set of first template images about a predetermined path in response to a received input.

22. The method of claim 14, wherein the predetermined path is a carousel type path.

23. The method of claim 14, further comprising communicating with a printing device to cause a printed item represented in a selected template image of the first or second set of template images to be printed.

24. The method of claim 14, wherein at least one of the template images in the first or second set includes a picture from a collection of user pictures.

25. The method of claim 14, wherein the printed items represented by the first set of template images are displayed as being arranged on a horizontal surface.

26. The method of claim 14, wherein each of the displayed template images corresponds to a design for a printed media item to be generated.

27. The method of claim 26, wherein the printed media item to be generated comprises one or more of a greeting card, a calendar, a business card, a book, and a magazine.

28. A non-transitory computer-readable medium tangibly encoding computer software instructions executable by data processing apparatus to perform operations comprising:
displaying a first set of first template images in a first region of a display screen, each first template image is associated with a respective theme and includes a respective feature that is displayed with each first template image, each first template image associated with a second set of second template images that have the same theme as each first template image with which the second set of second template images is associated;
receiving input to move the first set of first template images about a predetermined path within the first region, wherein the predetermined path includes a location;
in response to receiving the input, moving a first template image to the location;
identifying the first template image that has been moved to the location;
in response to identifying the first template image that has been moved to the location:
displaying the selected first template image with a feature in the first region of the display screen,
identifying a second set of second template images associated with the selected first template image that have the same theme as the selected first template image, and
displaying each second template image in the identified second set of template images in a second region of the display screen adjacent the first region, wherein a second template image included in the identified second set includes a feature that is different from the feature that is displayed with the selected first template image in the first region of the display screen.

29. The medium of claim 28, wherein at least one second template image in the identified second set of template images depicts an inside view of a printed media item depicted in the first template image.

30. The medium of claim 28, wherein the operations further comprise:
receiving an indication of a design aspect for the first template image; and
changing the second template images in the identified second set of template images to reflect the indicated design aspect.

31. The medium of claim 28, wherein the operations further comprise:
receiving an input indicating a selection of the first template image; and
displaying, in the first region, a media item image depicting an opened version of a printed media item depicted in the first template image.

32. The medium of claim 28, wherein at least one of the template images in the first or second set includes a picture from a collection of user pictures.

33. The medium of claim 28, wherein the template images included in the first set are displayed as being arranged on a horizontal surface.

34. The medium of claim 28, wherein each first template image displayed in the first region corresponds to a design for a printed media item to be generated.

35. The medium of claim 34, wherein the printed media item to be generated comprises one or more of a greeting card, a calendar, a business card, a book, and a magazine.

36. A non-transitory computer-readable medium tangibly encoding computer software instructions executable by data processing apparatus to perform operations comprising:
displaying, in a first display region, a first set of first template images, each first template image associated with a theme, each first template image associated with a second set of one or more second template images that have the same theme as each first template image with which the second set of second template images is associated, where each first template image in the first set of first template images represents a printed item;
receiving an indication of a selection of a first template image of the first set of first template images; and
in response to receiving the indication of the selection of the first template image:
displaying, in the first display region, the first template image in an emphasized visual manner with respect to the remaining first template images in the first set of first template images,
identifying a second set of one or more second template images associated with the selected first template image that have the same theme as the selected first template image, and
displaying, in a second display region that is adjacent the first display region, the one or more second template images included in the second set of second template images.

37. The medium of claim 36, wherein at least one image in the second set of second template images is not included in the first set of first template images.

38. The medium of claim 36, wherein at least one image in the second set of second template images is the same as the selected first template image.

39. The medium of claim 36, wherein at least one second template image in the second set of second template images is an opened view of a printed item represented by the selected first template image.

40. The medium of claim 36, wherein each second template image in the second set of second template images represents a possible configuration of a printed item theme represented in the selected first template image.

41. The medium of claim 36, wherein the operations further comprise:
 receiving an indication of a design aspect for the selected first template image; and
 changing the second template images in the second set of second template images to reflect the indicated design aspect.

42. The medium of claim 36, wherein the operations further comprise moving the first template images in the first set of first template images about a predetermined path in response to a received input.

43. The medium of claim 36, wherein at least one of the template images in the first or second set includes a picture from a collection of user pictures.

44. The medium of claim 36, wherein the printed items represented by the first set of template images are displayed as being arranged on a horizontal surface.

45. The medium of claim 36, wherein each of the displayed template images corresponds to a design for a printed media item to be generated.

46. The medium of claim 45, wherein the printed media item to be generated comprises one or more of a greeting card, a calendar, a business card, a book, and a magazine.

47. A system comprising:
 data processing apparatus; and
 a computer-readable medium storing instructions executable by the data processing apparatus to perform operations comprising:
  displaying a first set of first template images in a first region of a display screen, each first template image is associated with a respective theme and includes a respective feature that is displayed with each first template image, each first template image associated with a second set of second template images that have the same theme as each first template image with which the second set of second template images is associated;
 receiving input to move the first set of first template images about a predetermined path within the first region, wherein the predetermined path includes a location;
 in response to receiving the input, moving a first template image to the location;
 identifying the first template image that has been moved to the location;
 in response to identifying the first template image that has been moved to the location:
  displaying the selected first template image with a feature in the first region of the display screen,
  identifying a second set of second template images associated with the selected first template image that have the same theme as the selected first template image, and
  displaying each second template image in the identified second set of template images in a second region of the display screen adjacent the first region, wherein a second template image included in the identified second set includes a feature that is different from the feature that is displayed with the selected first template image in the first region of the display screen.

48. The system of claim 47, wherein the predetermined path is a carousel type path.

49. The system of claim 47, wherein at least one second template image in the identified second set of template images is the same as the first template image.

50. The system of claim 47, wherein at least one second template image in the identified second set of template images depicts an inside view of a printed media item depicted in the first template image.

51. The system of claim 47,
 wherein the input device is further configured to receive an indication of a design aspect for the indicated media item image; and
 wherein the display device is further configured to display a change to the media item images in the second set of media item images to reflect the indicated design aspect.

52. The system of claim 47, wherein at least one of the template images in the first or second set includes a picture from a collection of user pictures.

53. The system of claim 47, wherein the template images included in the first set are displayed as being arranged on a horizontal surface.

54. The system of claim 47, wherein each first template image displayed in the first region corresponds to a design for a printed media item to be generated.

55. The system of claim 54, wherein the printed media item to be generated comprises one or more of a greeting card, a calendar, a business card, a book, and a magazine.

56. A system comprising:
 data processing apparatus; and
 a computer-readable medium storing instructions executable by data processing apparatus to perform operations comprising:
  displaying, in a first display region, a first set of first template images, each first template image associated with a theme, each first template image associated with a second set of one or more second template images that have the same theme as each first template image with which the second set of second template images is associated, where each first template image in the first set of first template images represents a printed item;
  receiving an indication of a selection of a first template image of the first set of first template images; and
  in response to receiving the indication of the selection of the first template image:
   displaying, in the first display region, the first template image in an emphasized visual manner with respect to the remaining first template images in the first set of first template images,
   identifying a second set of one or more second template images associated with the selected first template image that have the same theme as the selected first template image, and
   displaying, in a second display region that is adjacent the first display region, the one or more second template images included in the second set of second template images.

57. The system of claim 56, wherein at least one second template image in the second set of second template images is an opened view of a printed item represented by the selected first template image.

58. The system of claim 56, wherein each second template image in the second set of second template images represents a possible configuration of a printed item theme represented in the selected first template image.

59. The system of claim 56, the operations further comprising moving the images in the first set of images about a predetermined path response to a received input.

60. The system of claim 56, wherein at least one of the template images in the first or second set includes a picture from a collection of user pictures.

61. The system of claim 56, wherein the printed items represented by the first set of template images are displayed as being arranged on a horizontal surface.

62. The system of claim 56, wherein each of the displayed template images corresponds to a design for a printed media item to be generated.

63. The system of claim 62, wherein the printed media item to be generated comprises one or more of a greeting card, a calendar, a business card, a book, and a magazine.

64. A computer-implemented method comprising:
    identifying a first template image that is associated with a theme and that includes a feature, the first template image associated with a set of second template images, each second template image having the feature in common with the first template image;
    identifying an image that is related to the theme of the first template image based on metadata associated with the identified image;
    including the identified image in the first template image;
    displaying, in a first region of a user interface, the first template image including the identified image; and
    displaying, in a second region of the user interface, the second region being separate from the first region, the set of second template images, at least one second template image including the identified image that is included in the first template image.

65. The method of claim 64, wherein the first template image is included in a first set of first template images, each first template image associated with a respective theme and that includes a respective feature, the method further comprising, for each first template image included in the first set:
    identifying a respective image that is related to the respective theme based on metadata associated with the identified respective image;
    including the identified respective image in the first template image; and
    displaying, in the first region of the user interface, the first set of first template images, each first template image including the identified respective image.

66. The method of claim 65, wherein displaying, in the first region of the user interface, the first set of first template images comprises displaying the first set of first template images about a predetermined path within the first region.

67. The method of claim 66, further comprising:
    receiving input to move the first set of template images about the predetermined path within the first region, wherein the predetermined path includes a location;
    in response to receiving the input, moving a first template image to the location;
        identifying the first template image that has been moved to the location;
        in response to identifying the first template image that has been moved to the location:
            displaying the selected first template image with a feature in the first region of the display screen,
            identifying a second set of second template images associated with the selected first template image that have the same theme as the selected first template image, and
            displaying each second template image in the identified second set of template images in a second region of the display screen adjacent the first region, wherein a second template image included in the identified second set includes a feature that is different from the feature that is displayed with the selected first template image in the first region of the display screen.

68. The method of claim 64, wherein the metadata associated with the identified image comprises a time at which the identified image was captured, and wherein identifying an image that is related to the theme of the first template image based on metadata associated with the identified image comprises:
    determining that the theme is associated with a time of the year;
    determining that the image was captured during the time of the year; and
    determining that the image is related to the theme.

69. The method of claim 68, wherein the time of the year is a holiday time.

70. A non-transitory computer-readable medium storing instructions executable by one or more processors to perform operations comprising:
    identifying a plurality of first template images, each first template image associated with a respective theme, each first template image associated with a respective plurality of second template images, each second template image having at least one feature in common with a first template image to which each second template image is associated;
    displaying the plurality of first template images in a first region of a user interface;
    receiving a selection of a first template image;
    in response to receiving the selection:
        identifying a theme associated with the selected first template image;
        identifying an image that is related to the identified theme based on metadata associated with the identified image;
        including the identified image in the selected first template image;
        displaying the selected first template image including the identified image more prominently relative to unselected first template images of the plurality of first template images in the first region of the user interface; and
        displaying, in a second region of the user interface, the second region being separate from the first region, a subset of a plurality of second template images with which the selected first template image is associated, at least one second template image including the identified image that is included in the selected first template image.

71. The medium of claim 70, wherein the metadata associated with the identified image comprises a time at which the identified image was captured, and wherein identifying an image that is related to the theme of the first template image based on metadata associated with the identified image comprises:
    determining that the theme is associated with a time of the year;
    determining that the image was captured during the time of the year; and
    determining that the image is related to the theme.

72. The medium of claim 71, wherein the time of the year is a holiday time.

\* \* \* \* \*